United States Patent
Samejima et al.

(10) Patent No.: US 10,668,811 B2
(45) Date of Patent: Jun. 2, 2020

(54) POWER SUPPLY SYSTEM AND RAILROAD CAR

(71) Applicant: KOITO ELECTRIC INDUSTRIES, LTD., Nagaizumi-cho, Sunto-gun, Shizuoka (JP)

(72) Inventors: Akitaka Samejima, Shizuoka (JP); Takayuki Izumi, Shizuoka (JP); Jun Matsunaga, Shizuoka (JP); Kazuo Maruyama, Shizuoka (JP)

(73) Assignee: KOITO ELECTRIC INDUSTRIES, LTD., Nagaizumi-Cho, Sunto-Gun, Shizuoka (JP)

( * ) Notice: Subject to any disclaimer, the term of this patent is extended or adjusted under 35 U.S.C. 154(b) by 185 days.

(21) Appl. No.: 16/073,672

(22) PCT Filed: Jan. 30, 2017

(86) PCT No.: PCT/JP2017/003163
§ 371 (c)(1),
(2) Date: Jul. 27, 2018

(87) PCT Pub. No.: WO2017/131227
PCT Pub. Date: Aug. 3, 2017

(65) Prior Publication Data
US 2019/0031029 A1 Jan. 31, 2019

(30) Foreign Application Priority Data
Jan. 29, 2016 (JP) .................. 2016-016607

(51) Int. Cl.
*B60L 1/16* (2006.01)
*B60L 1/00* (2006.01)
(Continued)

(52) U.S. Cl.
CPC .................. *B60L 1/16* (2013.01); *B60L 1/003* (2013.01); *B60Q 3/47* (2017.02); *B60Q 3/80* (2017.02);
(Continued)

(58) Field of Classification Search
CPC ........ B60L 1/16; B60L 1/003; B60L 2200/26; B60Q 3/80; B60Q 3/47; H05B 45/50; H05B 47/10; H02J 7/00; F21Y 2115/10
See application file for complete search history.

(56) References Cited

FOREIGN PATENT DOCUMENTS

| EP | 2444294 A1 | 4/2012 |
|---|---|---|
| JP | 2004-166437 A | 6/2004 |

(Continued)

OTHER PUBLICATIONS

International Search Report in International Application No. PCT/JP2017/003163, filed Jan. 30, 2017.

*Primary Examiner* — Robert L Deberadinis
(74) *Attorney, Agent, or Firm* — Saliwanchik, Lloyd & Eisenschenk (57) ABSTRACT

A power supply system (120) according to an embodiment of the present invention includes a first power supply device (121), a second power supply device (122), and an addition circuit (123). The first power supply device (121) includes a first driving circuit that outputs a first direct current from a first power supply input and a first control circuit that controls the first driving circuit. The second power supply device (122) includes a second driving circuit that outputs a second direct current from a second power supply input and a second control circuit that monitors the first driving circuit and controls the second driving circuit. The addition circuit (123) is connected to an output terminal of each of the first and second power supply devices (121, 122) and outputs a third direct current that is a value obtained by adding the first (Continued)

and second direct currents to a load device (on-board illumination device (110)).

7 Claims, 7 Drawing Sheets

(51) Int. Cl.
*B60Q 3/47* (2017.01)
*H02J 7/00* (2006.01)
*H05B 45/50* (2020.01)
*H05B 47/10* (2020.01)
*B60Q 3/80* (2017.01)
*F21Y 115/10* (2016.01)

(52) U.S. Cl.
CPC ............... *H02J 7/00* (2013.01); *H05B 45/50* (2020.01); *H05B 47/10* (2020.01); *B60L 2200/26* (2013.01); *F21Y 2115/10* (2016.08)

(56) References Cited

FOREIGN PATENT DOCUMENTS

| | | | |
|---|---|---|---|
| JP | 2008-131787 | A | 6/2008 |
| JP | 2009-5555 | A | 1/2009 |
| JP | 2011-165626 | A | 8/2011 |
| JP | 2012-210013 | A | 10/2012 |
| JP | 5661420 | B2 | 1/2015 |

| State | Result of communication with power supply device 1 | | | Result of communication with control device | | | Determination | Operation 1 | Operation 2 |
|---|---|---|---|---|---|---|---|---|---|
| | Normal | Lighting impossible (with response) | With no response | Normal | Disconnection of pantograph | Abnormal (with no response) | | | |
| 1 | O | — | — | O | — | — | Normal | Light up normally | |
| 2 | O | — | — | — | O | — | Driving of storage battery due to disconnection of pantograph | Lower output current to ensure minimum necessary brightness and reduce power consumption of battery | |
| 3 | O | — | — | — | — | O | Abnormality of control device | Maintain output current as it is to keep brightness in compartment | |
| 4 | — | O | — | O | — | — | Failure of power supply device 1 | Increase output current to keep brightness in compartment | |
| 5 | — | O | — | — | O | — | Failure of power supply device 1 Driving of storage battery due to disconnection of pantograph | Lower output current to ensure minimum necessary brightness and reduce power consumption of battery | |
| 6 | — | O | — | — | — | O | Failure of power supply device 1 Abnormality of control device | Increase output current to keep brightness in compartment | Inform control device of failure of power supply device 2 |
| 7 | — | — | O | O | — | — | Failure of power supply device 1 | Maintain output current as it is | |
| 8 | — | — | O | — | O | — | Failure of power supply device 1 Driving of storage battery due to disconnection of pantograph | Lower output current to ensure minimum necessary brightness and reduce power consumption of battery | |
| 9 | — | — | O | — | — | O | Failure of power supply device 1 Abnormality of control device | Maintain output current as it is | |

| State | Input from power supply device 1 | | Input from control device | | Determination | Operation 1 | Operation 2 |
|---|---|---|---|---|---|---|---|
| | Normal | Abnormal | Normal | Abnormal (disconnection of pantograph) | | | |
| 1 | O | — | O | — | Normal | Light up normally | |
| 2 | O | — | — | O | Driving of storage battery due to disconnection of pantograph | Lower output current to ensure minimum necessary brightness and reduce power consumption of battery | |
| 3 | — | O | O | — | Failure of power supply device 1 | Increase output current to keep brightness in compartment | |
| 4 | — | O | — | O | Failure of power supply device 1 Driving of storage battery due to disconnection of pantograph | Lower output current to ensure minimum necessary brightness and reduce power consumption of battery | Inform control device of failure of power supply device 1 |

POWER SUPPLY SYSTEM AND RAILROAD CAR

CROSS-REFERENCE TO RELATED APPLICATIONS

This application is the U.S. national stage application of International Patent Application No. PCT/JP2017/003163, filed Jan. 30, 2017, which claims priority to Japanese Application No. 2016-016607, filed Jan. 29, 2016, the disclosures of each of which are incorporated herein by reference in their entirety.

TECHNICAL FIELD

The present invention relates to a power supply system that supplies power to an LED illumination device and the like, for example, and to a railroad car including the same.

BACKGROUND ART

Fluorescent lamps are widely used for an on-board illumination device of a railroad car. In recent years, light emitting diode (LED) lights are being propagated as lighting devices instead of the fluorescent lamps. The on-board illumination device includes a plurality of lighting devices. At least several tens of lighting devices are provided in each car. In a case where accessory power supply devices are attached to those lighting devices, there are problems on a mounting space, weight, and the like.

However, a technology in which an integrated power supply device is used for supplying power to the plurality of illumination devices and power is supplied from that power supply device to each illumination device is known. For example, Patent Literature 1 has disclosed a railroad car configured such that a common power supply device supplies power to a plurality of LED illumination devices connected in series.

CITATION LIST

Patent Literature

Patent Literature 1: Japanese Patent No. 5661420

DISCLOSURE OF INVENTION

Technical Problem

However, in the case where the integrated power supply device is used, if an abnormality such as a failure occurs in that power supply device, there is a problem that all the illumination devices are turned off. For example, if the power supply device fails when the car is travelling in a tunnel or when the car is travelling night, there is a fear that sufficient on-board illumination cannot be ensured and a passenger feels uneasy or fear.

In view of the above-mentioned circumstances, it is an object of the present invention to provide a power supply system capable of avoiding turning off of an illumination device due to a failure of a power supply device and a railroad car including the same.

Solution to Problem

In order to accomplish the above-mentioned object, a power supply system according to an embodiment of the present invention includes a first power supply device, a second power supply device, and an addition circuit.

The first power supply device includes a first driving circuit that outputs a first direct current from a first power supply input, and a first control circuit that controls the first driving circuit.

The second power supply device includes a second driving circuit that outputs a second direct current from a second power supply input, and a second control circuit that monitors the first driving circuit and controls the second driving circuit.

The addition circuit is connected to an output terminal of each of the first and second power supply devices and outputs a third direct current that is a value obtained by adding the first and second direct currents to a load device.

In the power supply system, the first and second power supply devices are added and connected to the load device. Thus, even if either one of the first and second power supply devices fails, the power can be stably supplied to the load device by using the output of the other one. Further, by performing the output control while the first and second power supply devices are mutually monitoring each other, a failure of either one of the first and second power supply devices can be compensated by the output of the other one.

The first control circuit may be configured to be capable of monitoring a state of the second driving circuit.

The first and second control circuits may be configured to control the first and second driving circuits such that when an output of either one of the first and second driving circuits drops, an amount corresponding to the drop is compensated by an output of the other one.

With this configuration, the third direct current can be stably maintained.

The first power supply input may be AC power or DC power, the second power supply input may be DC power, and the power supply system may further include a storage battery connected to the second power supply device.

The power supply system may further include a control device that controls the first and second power supply devices.

The control device may be configured to, when detecting an abnormality in the first and second power supply inputs, from a first state in which the second power supply input is supplied to the second power supply device to a second state in which discharged power of the storage battery is supplied to the second power supply device.

The control device may be configured to output, in the second state, a control command to reduce the third direct current to the second control circuit.

With this configuration, the power of the storage battery can be maintained for a long time.

A railroad car according to an embodiment of the present invention includes an on-board illumination device, a first power supply device, a second power supply device, and an addition circuit.

The on-board illumination device includes a plurality of LEDs connected in series.

The first power supply device includes a first driving circuit that outputs a first direct current from a first power supply input, and a first control circuit that controls the first driving circuit.

The second power supply device includes a second driving circuit that outputs a second direct current from a second power supply input, and a second control circuit that monitors the first driving circuit and controls the second driving circuit.

The addition circuit is connected to an output terminal of each of the first and second power supply devices and outputs a third direct current that is a value obtained by adding the first and second direct currents to the on-board illumination device.

Advantageous Effects of Invention

As described above, in accordance with the present invention, it is possible to avoid turning off of an illumination device due to a failure of a power supply device.

BRIEF DESCRIPTION OF DRAWINGS

FIG. 5 A table diagram for describing an action of the power supply system.

MODE(S) FOR CARRYING OUT THE INVENTION

Hereinafter, embodiments of the present invention will be described with reference to the drawings.

First Embodiment

Figure 1:
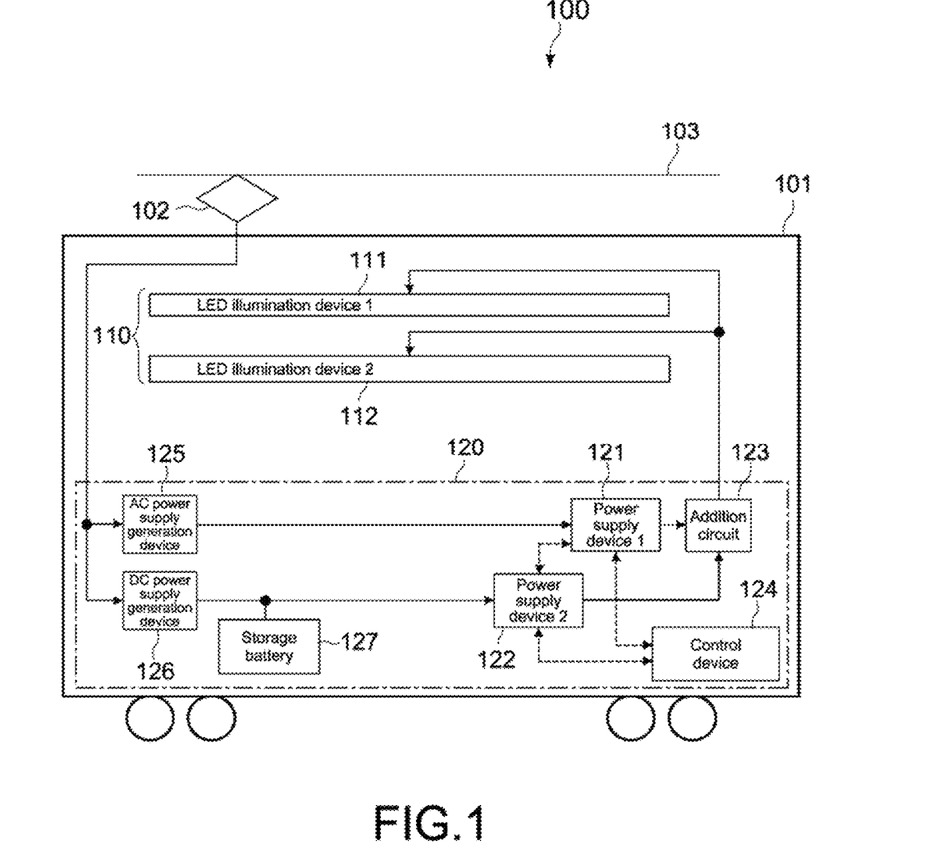
FIG. 1 A schematic configuration diagram of a railroad car according to an embodiment of the present invention.

FIG. 1 is a schematic configuration diagram of a railroad car according to an embodiment of the present invention.

A railroad car 100 includes a car main body 101, an on-board illumination device 110, and a power supply system 120 that actuates the on-board illumination device 110.

In this embodiment, a description will be made by exemplifying a car (car mainly used for railroad excluding bullet trains) in which the power supply input of the power supply system 120 is a mixed type of AC (alternate current) and DC (direct current) as the railroad car 100.

LED Illumination Device

The on-board illumination device 110 is mounted on an on-board ceiling portion of the car main body 101. In this embodiment, the on-board illumination device 110 includes the LED illumination devices 111, 112 in two rows which are arranged on both left- and right-hand sides with respect to a travelling direction. The LED illumination devices 111, 112 have the same configuration. For example, as shown in FIG. 2, each of the LED illumination devices 111, 112 includes a plurality of LED lighting devices 10 (LEDs) arrayed in the travelling direction.

Figure 2:
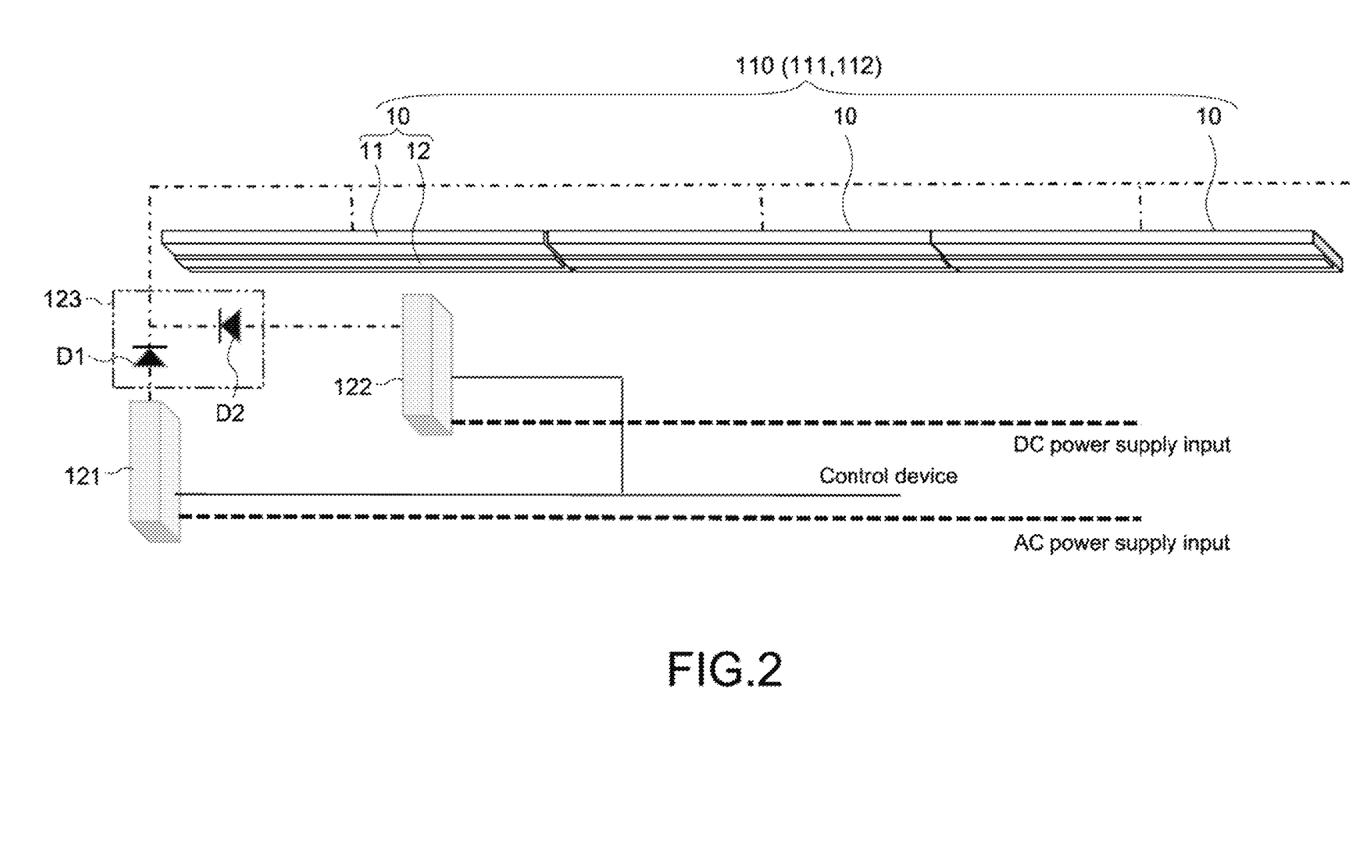
FIG. 2 A schematic diagram showing a connection example of an on-board illumination device and a power supply system in the railroad car.

FIG. 2 is a schematic diagram showing a connection example of the on-board illumination device 110 and the power supply system 120.

As shown in FIG. 2, the LED lighting device 10 includes a main body section 11 mounted on a compartment ceiling portion of the car main body 101 and a light-emitting section 12 including a plurality of built-in LED elements. The number of LED lighting devices 10 is not particularly limited. For example, 20 to 24 LED lighting devices 10 are provided in each car. The type of the LED lighting devices 10 is not particularly limited. For example, a 20 to 40 W, straight tube type, a reflective type, an indirect type, and the like can be employed. The plurality of LED lighting devices 10 of each of the LED illumination devices 111, 112 are connected in series. However, the plurality of LED lighting devices 10 of each of the LED illumination devices 111, 112 may be connected in parallel.

Each LED lighting device 10 receives an input of a direct-current power supply and causes the light-emitting section 12 to emit light. The light-emitting section 12 emits light with an illuminance depending on the magnitude of the input current. In this embodiment, light of each LED lighting device 10 is commonly controlled by the power supply system 120 to be described later. Note that each LED lighting device 10 may include a driving circuit capable of individually controlling light of the light-emitting section 12.

Power Supply System

The power supply system 120 includes a first power supply device 121, a second power supply device 122, and an adder 123. The first and second power supply devices 121, 122 are configured to output a direct current having a predetermined voltage to the on-board illumination device 110.

The power supply system 120 further includes a control device 124 that controls the first and second power supply devices 121, 122, an AC power supply generation device 125 that inputs AC power into the first power supply device 121, a DC power supply generation device 126 that inputs DC power into the second power supply device 122, and a storage battery 127.

The AC power supply generation device 125 and the DC power supply generation device 126 are electrically connected to a pantograph 102 mounted on an upper surface of the car main body 101. The pantograph 102 is held in contact with an overhead line (power transmission line) 103 and supplies AC power to the AC power supply generation device 125 and the DC power supply generation device 126. The AC power supply generation device 125 converts the transmission power into predetermined AC power (e.g., AC 90 to 280 V) and inputs it into the first power supply device 121. The DC power supply generation device 126 converts the transmission power into predetermined DC power (e.g., DC 70 to 110 V) and inputs it into the second power supply device 122 and the storage battery 127.

Figure 3:
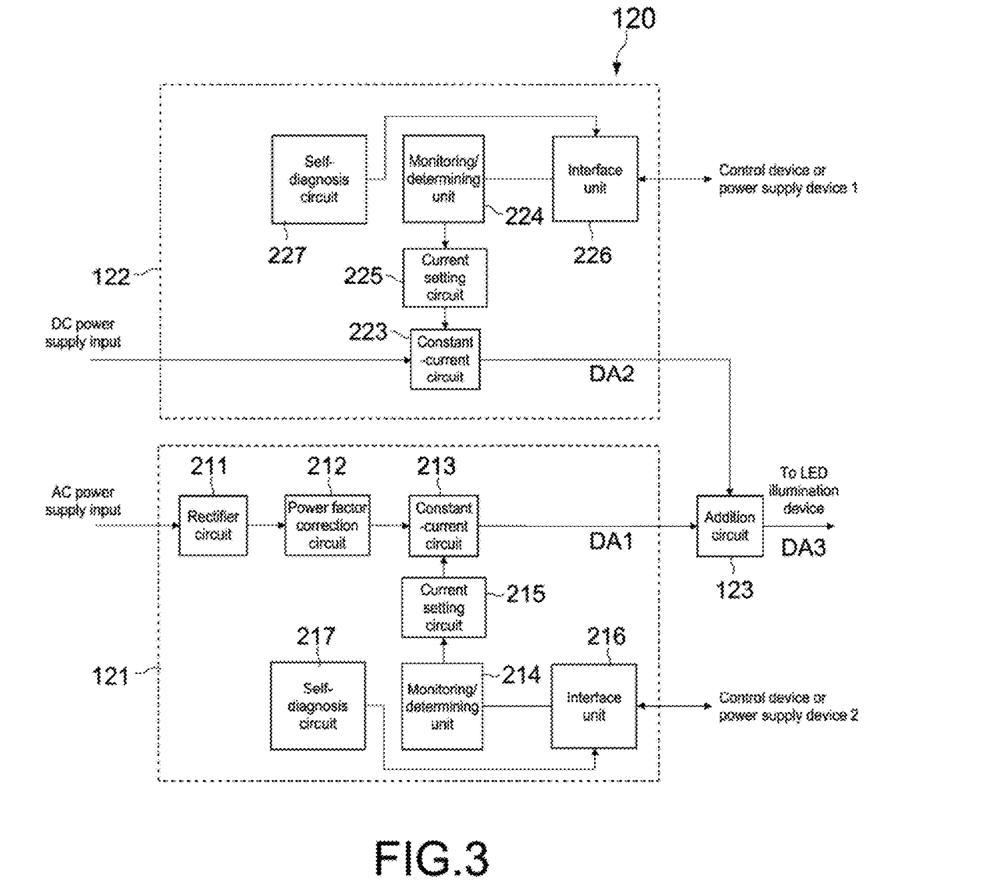
FIG. 3 A block diagram showing configurations of first and second power supply devices in the power supply system.

FIG. 3 is a block diagram showing configurations of the first and second power supply devices 121, 122.

The first power supply device 121 includes a rectifier circuit 211, a power factor correction circuit 212, a constant-current circuit 213, a monitoring/determining unit 214, a current setting circuit 215, an interface unit 216, and a self-diagnosis circuit 217.

The rectifier circuit 211, the power factor correction circuit 212, and the constant-current circuit 213 configure a "first driving circuit" that outputs a first direct current DA1 from AC power (first power supply input) input from the AC power supply generation device 125.

The rectifier circuit 211 and the power factor correction circuit 212 are not limited to the case where these are individually configured. These may be configured in combination with each other like a capacitor input type rectifier circuit with a power factor correction (PFC) circuit or the like. The output (first direct current DA1) of the constant-current circuit 213 is variably controlled by the current setting circuit 215.

The monitoring/determining unit 214, the current setting circuit 215, and the interface unit 216 configure a "first control circuit" that controls the first driving circuit.

The monitoring/determining unit 214 typically includes a computer including a CPU and a memory and is configured to be capable of monitoring the first driving circuit on the basis of an output from a self-diagnosis circuit 227 of the second power supply device 122, which is received via the interface unit 216, and controlling an output setting of the constant-current circuit 213 by the current setting circuit 215. The monitoring/determining unit 214 is further configured to be capable of communicating with the control device 124 via the interface unit 216 and controlling an output setting of the constant-current circuit 213 by the current setting circuit 215 on the basis of an output of the control device 124.

The self-diagnosis circuit 217 diagnoses an operation of the first driving circuit (rectifier circuit 211, power factor correction circuit 212, and constant-current circuit 213) and outputs information regarding the presence/absence of an abnormality of the operation to the control device 124 or the second power supply device 122 via the interface unit 216.

On the other hand, the second power supply device 122 includes a constant-current circuit 223, a monitoring/determining unit 224, a current setting circuit 225, an interface unit 226, and the self-diagnosis circuit 227.

The constant-current circuit 223 configures a "second driving circuit" that outputs a second direct current DA2 from DC power (second power supply input) input from the DC power supply generation device 126 or the storage battery 127.

The monitoring/determining unit 224, the current setting circuit 225, and the interface unit 226 configure a "second control circuit" that controls the second driving circuit.

The monitoring/determining unit 224 typically includes a computer including a CPU and a memory and is configured to be capable of monitoring the second driving circuit on the basis of an output from the self-diagnosis circuit 217 of the first power supply device 121, which is received via the interface unit 226, and controlling an output setting of the constant-current circuit 223 by the current setting circuit 225. The monitoring/determining unit 224 is further configured to be capable of communicating with the control device 124 via the interface unit 226 and controlling an output setting of the constant-current circuit 223 by the current setting circuit 225 on the basis of an output of the control device 124.

The self-diagnosis circuit 227 diagnoses an operation of the second driving circuit (constant-current circuit 223) and outputs the presence/absence of an abnormality of the operation to the control device 124 or the first power supply device 121 via the interface unit 226.

The addition circuit 123 is connected to an output terminal of each of the first and second power supply devices 121, 122 and is configured to be capable of outputting a third direct current DA3 that is a value obtained by adding the first and second direct currents DA1, DA2 to the on-board illumination device 110.

Figure 4:
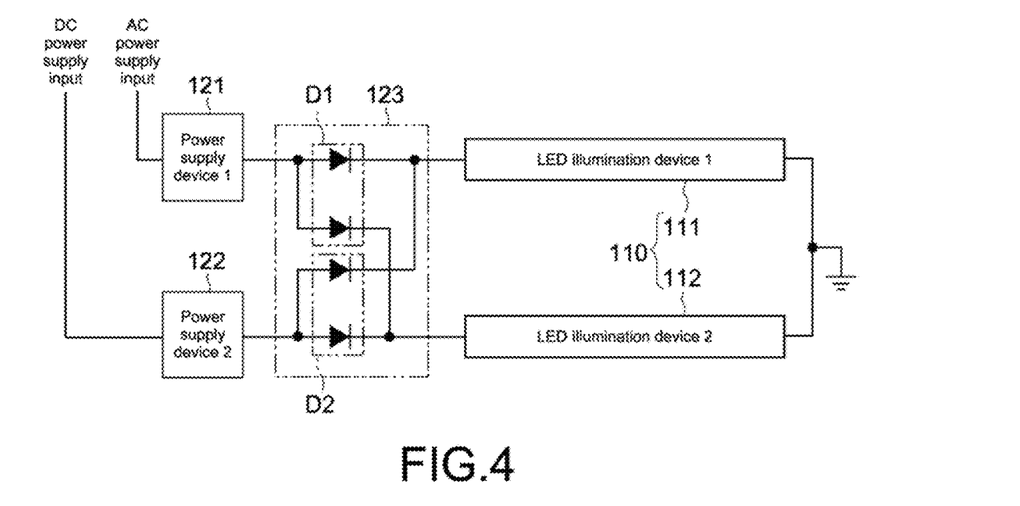
FIG. 4 A diagram showing a configuration example of an addition circuit in the power supply system.

FIG. 4 shows a configuration example of the addition circuit 123. The addition circuit 123 supplies the output (first direct current DA1) of the first power supply device 121 to the on-board illumination device 110 via a rectifier element D1 and supplies the output (second direct current DA2) from the second power supply device 122 to the on-board illumination device 110 via a rectifier element D2. The rectifier elements D1, D2 have a function of inhibiting countercurrent to the first and second power supply devices 121, 122.

The control device 124 corresponds to an upper-level device to the first and second power supply devices 121, 122 and comprehensively controls the power supply system 120. The control device 124 monitors the presence/absence of a power transmission failure of the overhead line 103, an abnormality of a power supply input system including the pantograph 102, the AC power supply generation device 125, the DC power supply generation device 126, and the like.

The control device 124 includes, for example, a computer including a CPU, a memory, and the like and includes a display unit provided in a driver's cab or the like. The control device 124 is capable of mutually communicating with the first and second power supply devices 121, 122 (first and second control circuits) via the interface units 216, 226 as described above. The control device 124 outputs a light control command with respect to the on-board illumination device 110 to the first and second power supply devices 121, 122 and monitors the presence/absence of a failure of the first and second power supply devices 121, 122.

The control device 124 controls the magnitude of a current supplied to the on-board illumination device 110. In a normal operation (when no abnormality occurs in the power supply input system and the first and second power supply devices 121, 122), the control device 124 controls the outputs of the first and second power supply devices 121, 122 such that all the lighting devices 10 of the on-board illumination device 110 obtain a current value necessary for emitting light with a predetermined illuminance. That is, the first and second power supply devices 121, 122 are controlled to output the first and second output currents DA1, DA2 such that the third direct current DA3 corresponding to the current value can be obtained. In this embodiment, the constant-current circuits 213, 223 are controlled via each of the monitoring/determining units 214, 224 such that the output currents (DA1, DA2) from the first and second power supply devices 121, 122 are the same.

Here, as described above, the first and second power supply devices 121, 122 are capable of mutually communicating with the interface units 216, 226. The monitoring/determining units 214, 224 are configured to be capable of informing each other of results of diagnosis obtained by the self-diagnosis circuits 217, 227 and detecting abnormalities of the respective counterparts. Then, the monitoring/determining units 214, 224 control the current setting circuits 215, 225 such that when an abnormality occurs in either one of the first and second power supply devices 121, 122 and the output drops, an amount corresponding to the drop is compensated by the output of the other one. That is, the monitoring/determining units 214, 224 respectively control the outputs (first and second direct currents DA1, DA2) of the constant-current circuits 213, 223 such that the output (third direct current DA3) of the addition circuit 123 is maintained constant, to thereby stably maintain the illuminance of the on-board illumination device 110.

Although in this embodiment, the outputs of the self-diagnosis circuits 217, 227 are sent to the monitoring/determining units 214, 224 of the power supply devices 121, 122 that are the counterparts via the control device 124, the present invention is not limited thereto. The outputs of the self-diagnosis circuits 217, 227 may be sent to the monitoring/determining units 214, 224 of the power supply devices 121, 122 that are the counterparts via the control device 124. Further, the monitoring/determining units 214, 224 are configured to respectively control the constant-current circuits 213, 223 on the basis of the outputs of the self-diagnosis circuits 217, 227 that are the counterparts. However, the monitoring/determining units 214, 224 may be configured to respectively control the constant-current circuits 213, 223 on the basis of the control command from the control device 124 which has received the outputs of the self-diagnosis circuits 217, 218.

The storage battery 127 is connected between the DC power supply generation device 126 and the second power supply device 122. The storage battery 127 is configured to be capable of being charged with the output of the DC power supply generation device 126 and being discharged in case of a failure of the DC power supply generation device 126. The discharge of the storage battery 127 is controlled by the control device 124. In this embodiment, when detecting an abnormality of the power supply input system, the control device 124 is configured to switch from a first state in which the output (second power supply input) of the DC power supply generation device 126 is supplied to the second power supply device 122 to a second state in which discharged power of the storage battery 127 is supplied to the second power supply device 122.

That is, if an abnormality occurs in the power supply input system, the outputs of the AC power supply generation device 125 and the DC power supply generation device 126 stop. As a result, the outputs of the first and second power supply devices 121, 122 also stop, and thus the on-board illumination device 110 is turned off and the safety and the comfortability in the compartment are deteriorated. In order to inhibit it, when an abnormality occurs in the power supply input system, in the control device 124, the storage battery 127 instead of the DC power supply generation device 126 inputs power into the second power supply device 122. With this configuration, the on-board illumination device 110 is inhibited from being turned off and the safety and the comfortability in the compartment are ensured.

Note that in case of that power supply abnormality, it is only necessary to maintain the on-board illumination until the power is restored. Thus, the on-board illumination device 110 only needs to ensure a minimum necessary illuminance. In this embodiment, in the state (second state) in which the storage battery 127 is used as the power source, the control device 124 is configured to output a control command to reduce the third direct current output from the addition circuit 123 to the monitoring/determining unit 224 (second control circuit) of the second power supply device 122. With this configuration, it becomes possible to maintain the power of the storage battery 127 for a long time.

Operations of Power Supply System

Next, operations of the power supply system 120 configured as described above will be described.

The control device 124 outputs a light control command of the on-board illumination device 110 to the first and second power supply devices 121, 122. In a normal operation in which no abnormality occurs in the power supply system 120, the on-board illumination device 110 is driven with a direct current obtained by the addition circuit 123 adding currents generated by the first and second power supply devices 121, 122. With this configuration, the light-emitting section 12 emits light with a predetermined illuminance (brightness) depending on the magnitude of that direct current.

The operation of the first power supply device 121 is monitored by the self-diagnosis circuit 217 and information regarding the presence/absence of a failure is output to the monitoring/determining unit 224 of the second power supply device 122. Similarly, the operation of the second power supply device 122 is monitored by the self-diagnosis circuit 227 and information regarding the presence/absence of a failure is output to the monitoring/determining unit 214 of the first power supply device 121. The first and second power supply devices 121, 122 communicate with the control device 124 that is an upper-level device thereto and receive information regarding the presence/absence of an abnormality of the power supply input system such as the pantograph 102.

FIG. 5 is a diagram for describing the outline of operations of the monitoring/determining unit 224 in the second power supply device 122 (power supply device 2). FIG. 5 shows an operation table according to results of communication with the first power supply device 121 (power supply device 1) and the control device 124.

State 1

The monitoring/determining unit 224 communicates with the first power supply device 122 and the control device 124 in a predetermined time cycle and determines the presence/absence of an abnormality such as a failure thereof. When the communication with the first power supply device 121 and the communication with the control device 124 are both normal, the monitoring/determining unit 224 determines that the power supply system 120 is normal, and outputs a direct current corresponding to a current value in the normal operation as the second direct current DA2 to the addition circuit 123.

In this embodiment, in the normal operation of the power supply system 120, the outputs of the first and second power supply devices 121, 122 are the same. Thus, the "current value in the normal operation" is half the magnitude of the current value necessary for causing the on-board illumination device 110 to emit light with normal brightness.

The above-mentioned normal determination is made also in the first power supply device 121. In this manner, the same direct current as the second direct current DA2 is output to the addition circuit 123 as the first direct current DA1. With this configuration, the third direct current DA3 that is a current obtained by adding the first and second direct currents DA1, DA2 is supplied to the on-board illumination device 110 and the light-emitting section 12 emits light with a predetermined illuminance depending on that current value.

States 2, 3

Next, a case where a power transmission failure or an abnormality occurs in the control device 124 in the state in which the first power supply device 121 is normal will be described.

When receiving information regarding disconnection of the pantograph 102 or the like from the control device 124, the monitoring/determining unit 224 determines that a power transmission failure occurs. Then, the control device 124 switches the power supply input into the second power supply device 122 from the DC power supply generation device 126 to the storage battery 127 and outputs a light control command of the on-board illumination device 110 to the second power supply device 122. Further, the control device 124 displays an alarm indicating that power transmission failure on a predetermined display unit.

The monitoring/determining unit 224 controls the current setting circuit 225 to set the output of the constant-current circuit 223 to an amount of current which enables the on-board illumination device 110 to be driven with minimum necessary brightness for illumination in the compartment. With this configuration, the safety and the comfortability in the compartment are ensured while the power of the storage battery 127 is maintained for a long time. Further, the LED illumination devices 111, 112 that configure the on-board illumination device 110 are commonly connected to the power supply system 120. Therefore, a comfort compartment space can be maintained while preventing inhibiting uneven brightness by the lighting devices 10.

Otherwise, when the communication with the control device 124 is disconnected (there is no response from the control device 124), the monitoring/determining unit 224 determines that an abnormality of the control device 124 occurs and further determines whether or not the power supply input is stably maintained on the basis of the output of the self-diagnosis circuit 217 of the first power supply device 121 or the like. If determining that the power supply input is stable, the monitoring/determining unit 224 maintains the output current of the constant-current circuit 223 as it is to keep the original brightness in the compartment.

States 4 to 6

Next, a case where a failure occurs in the driving circuit of the first power supply device 121 will be described.

When receiving a signal indicating that a failure occurs in the driving circuit (rectifier circuit 211, power factor correction circuit 212, or constant-current circuit 213) from the self-diagnosis circuit 217 in the first power supply device 121, the monitoring/determining unit 224 controls the output of the constant-current circuit 223 in a manner that depends on the presence/absence of an abnormality of the control device 124 or the presence/absence of a power transmission abnormality.

In addition, the monitoring/determining unit 224 informs the control device 124 of the failure of the first power supply device 121. The control device 124 displays the failure of the first power supply device 121 on the display unit (not shown) (hereinafter, the same applies).

That is, if a power transmission abnormality does not occur, the monitoring/determining unit 224 performs control to increase the output (second direct current DA2) of the constant-current circuit 223 such that an amount corresponding to the drop of the output (first direct current DA1) of the first power supply device 121 is compensated by the output of the second power supply device 122 irrespective of the presence/absence of an abnormality of the control device 124. With this configuration, the illuminance of the on-board illumination device 110 can be stably maintained.

On the other hand, if determining that the power transmission failure occurs, the monitoring/determining unit 224 controls the current setting circuit 225 to set the output of the constant-current circuit 223 to the amount of current which enables the on-board illumination device 110 to be driven with minimum necessary brightness for illumination in the compartment by using the storage battery 127 as the power source, on the basis of the light control command from the control device 124. With this configuration, the safety and the comfortability in the compartment are ensured while the power of the storage battery 127 is maintained for a long time. In addition, the monitoring/determining unit 224 informs the control device 124 of the failure of the first power supply device 121.

State 7 to 9

Next, if it is determined that an abnormality occurs, for example, if there is no response from the first power supply device 121, the monitoring/determining unit 224 performs control to increase the output (second direct current DA2) of the constant-current circuit 223 such that an amount corresponding to the drop of the output (first direct current DA1) of the first power supply device 121 is compensated by the output of the second power supply device 122 irrespective of the presence/absence of an abnormality of the control device 124 unless the power transmission failure occurs. With this configuration, the illuminance of the on-board illumination device 110 can be stably maintained.

On the other hand, if determining that the power transmission failure occurs, the monitoring/determining unit 224 controls the current setting circuit 225 to set the output of the constant-current circuit 223 to the amount of current which enables the on-board illumination device 110 to be driven with minimum necessary brightness for illumination in the compartment by using the storage battery 127 as the power source, on the basis of the light control command from the control device 124. With this configuration, the safety and the comfortability in the compartment are ensured while the power of the storage battery 127 is maintained for a long time.

Hereinabove, the operations performed mainly by the second power supply device 122 (monitoring/determining unit 224) has been described. However, the output of the first power supply device 121 is controlled also by the first power supply device 121 (monitoring/determining unit 214) on the basis of the operation table corresponding to FIG. 5.

Note that the storage battery 127 is not connected to the first power supply device 121. Therefore, the first power supply device 121 cannot perform the operations corresponding to States 2, 5, and 8 of FIG. 5. However, in a case where the second power supply device 121 can be adapted for DC power supply input, it can perform the operations corresponding to States 2, 5, and 8.

As described above, in the power supply system 120 of this embodiment, the first and second power supply devices 121, 122 are added and connected to the on-board illumination device 110. Therefore, even if either one of the first and second power supply devices 121, 122 fails, the power can be stably supplied to the on-board illumination device 110 by using the output of the other one. Further, by performing the output control while the first and second power supply devices 121, 122 are mutually monitoring each other, a failure of either one of the first and second power supply devices 121, 122 can be compensated by the output of the other one. In addition, even if a power transmission failure occurs, the power of the storage battery 127 can be used, and thus, the minimum necessary brightness in the compartment can be ensured.

Second Embodiment

Next, a second embodiment of the present invention will be described.

Figure 6:
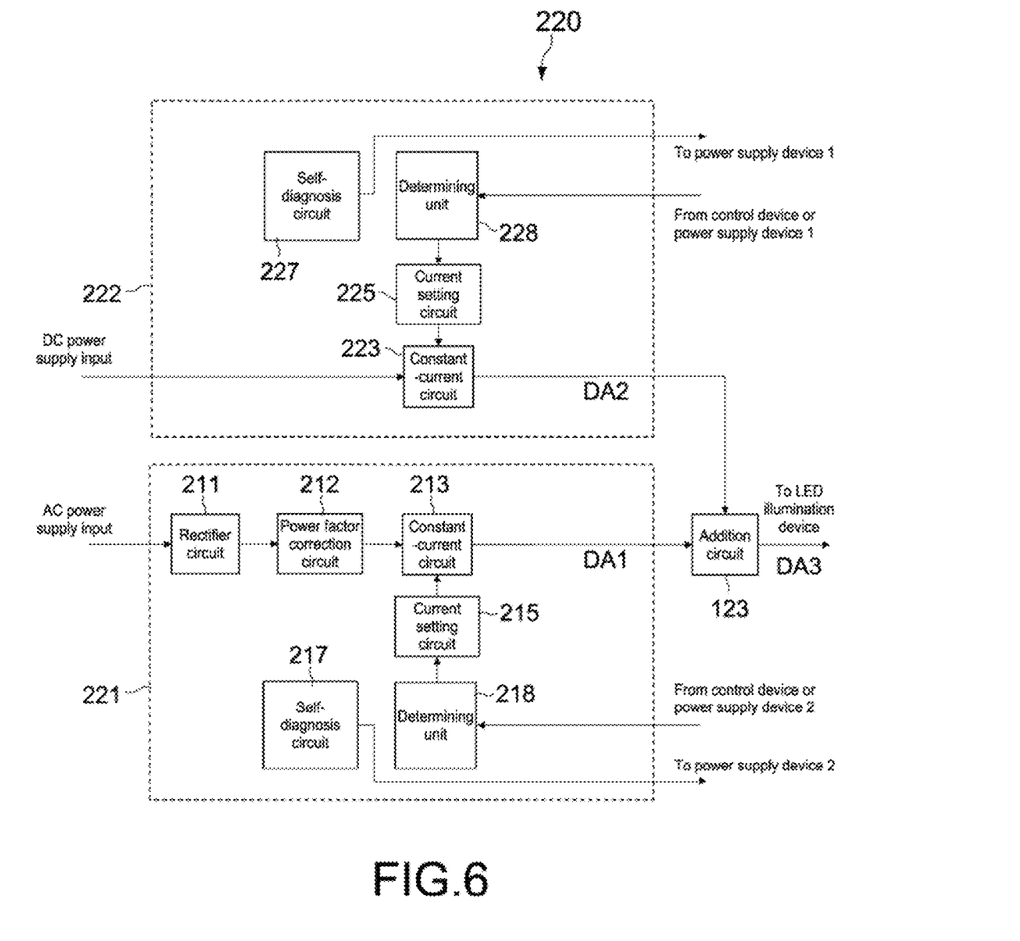
FIG. 6 A block diagram showing configurations of first and second power supply devices in a power supply system of another embodiment of the present invention.

FIG. 6 is a block diagram showing configurations of first and second power supply devices 221, 222 in a power supply system 220 of this embodiment.

Hereinafter, configurations different from those of the first embodiment will be mainly described and configurations similar to those of the first embodiment will be denoted by similar symbols and descriptions thereof will be omitted or simplified.

This embodiment is different from the first embodiment in that the first and second power supply devices 221, 222 of this embodiment do not include the monitoring/determining units 214, 224 and the interface units 216, 226 but include determining units 218, 228.

That is, the determining unit 218 in a first power supply device 221 is configured to determine the presence/absence of an abnormality of the control device 124 and a second power supply device 222, on the basis of a voltage signal (H or L) that is a binary value output from the control device 124 and a self-diagnosis circuit 227 of the second power supply device 222. Similarly, the determining unit 228 in the second power supply device 222 is configured to determine the presence/absence of an abnormality of the control device 124 and the first power supply device 221, on the basis of a voltage signal (H or L) that is a binary value output from the control device 124 and the self-diagnosis circuit 217 of the first power supply device 221. Thus, the configurations of the determining units 218, 228 are simplified and the system can be configured at low cost.

When the driving circuit to be diagnosed is normal, the self-diagnosis circuits 217, 227 are configured to output an H-level state signal. When the driving circuit to be diagnosed is abnormal, the self-diagnosis circuits 217, 227 are configured to output an L-level state signal. Those state signals are output to each of the control device 124 and the determining units 218, 228 of the power supply devices 221, 222 that are the counterparts. Further, the control device 124 is configured to output the H-level state signal to each of the determining units 218, 228 in a case where the control device 124 is normal. The control device 124 is configured to output the L-level state signal to each of the determining units 218, 228 in a case where the control device 124 is abnormal. The case where the control device 124 is abnormal includes a case where a failure of the control device 124 itself occurs as well as a case where a failure of a power transmission system including the pantograph 102 occurs.

Also in this embodiment, as in the above-mentioned first embodiment, the first and second power supply devices 221, 222 are configured to be capable of mutually monitoring the driving circuits that are the counterparts and controlling the outputs thereof in a manner that depends on the presence/absence of an abnormality thereof. Further, the first and second power supply devices 221, 222 are configured to be capable of controlling the outputs thereof in a manner that depends on the presence/absence of an abnormality of the control device 124. Operations performed mainly by the second power supply device 222 as in the first embodiment will be described as an example.

Figure 7:
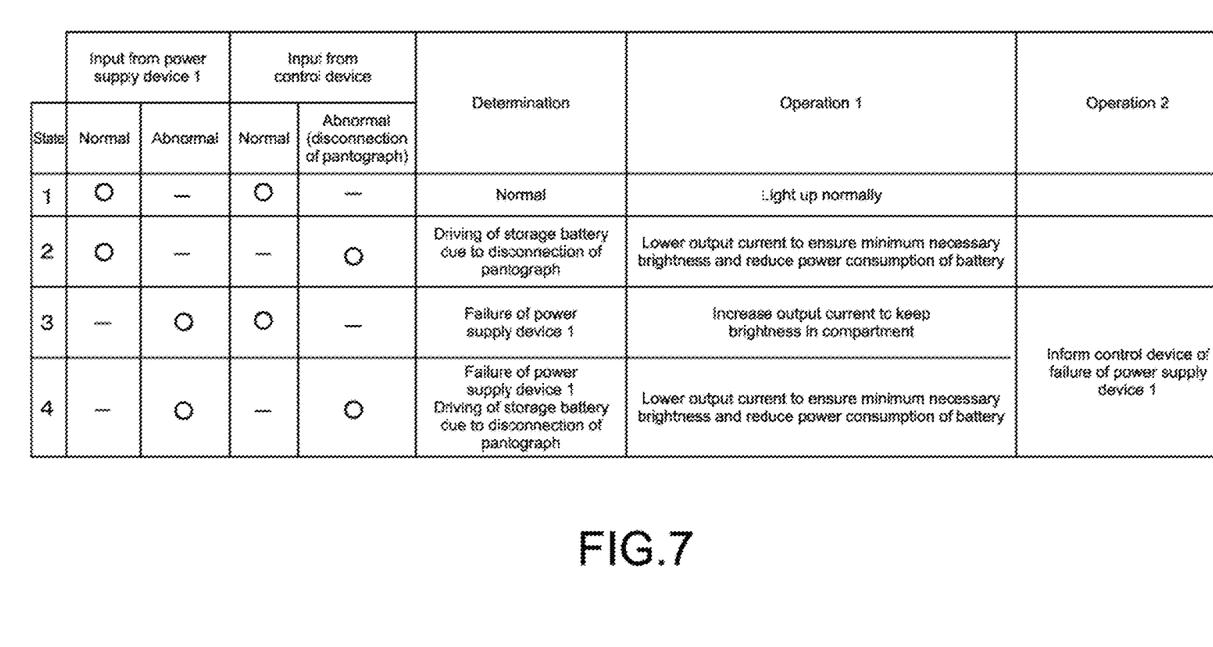
FIG. 7 A table diagram for describing an action of the power supply system.

FIG. 7 is a diagram for describing the outline of operations of the determining unit 228 in the second power supply device 122 (power supply device 2). FIG. 7 shows an operation table according to results of communication with the first power supply device 221 (power supply device 1) and the control device 124.

State 1

If the first power supply device 221 and the control device 124 are both normal, the determining unit 228 determines that the power supply system 220 is normal, and outputs a direct current corresponding to the current value in the normal operation as the second direct current DA2 to the addition circuit 123. Note that such a normal determination is made also in the first power supply device 221. In this manner, the same direct current as the second direct current DA2 is output to the addition circuit 123 as the first direct current DA1. With this configuration, the third direct current DA3 that is a current obtained by adding the first and second direct currents DA1, DA2 is supplied to the on-board illumination device 110 and the light-emitting section 12 emits light with a predetermined illuminance depending on that current value.

State 2

If the first power supply device 221 is normal and the control device 124 is abnormal, the determining unit 228 controls the current setting circuit 225 to set the output of the constant-current circuit 223 to the amount of current which enables the on-board illumination device 110 to be driven with minimum necessary brightness for illumination in the compartment by using the storage battery 127 as the power source. With this configuration, the safety and the comfortability in the compartment are ensured while the power of the storage battery 127 is maintained for a long time.

State 3

If the first power supply device 221 is abnormal and the control device 124 is normal, the determining unit 228 performs control to increase the output (second direct current DA2) of the constant-current circuit 223 such that an amount corresponding to the drop of the output (first direct current DA1) of the first power supply device 221 is compensated by the output of the second power supply device 222. With this configuration, the illuminance of the on-board illumination device 110 can be stably maintained. In addition, the determining unit 228 may inform the control device 124 of the failure of the first power supply device 221.

State 4

If both of the first power supply device 221 and the control device 124 are abnormal, the determining unit 228 controls the current setting circuit 225 to set the output of the constant-current circuit 223 to the amount of current which enables the on-board illumination device 110 to be driven with minimum necessary brightness for illumination in the compartment by using the storage battery 127 as the power source. With this configuration, the safety and the comfortability in the compartment are ensured while the power of the storage battery 127 is maintained for a long time.

As described above, also in this embodiment, action and effect similar to those of the first embodiment can be obtained.

Although the embodiments of the present invention have been described above, the present invention is not limited only to the above-mentioned embodiments and various modifications can be made as a matter of course.

Figure 8:
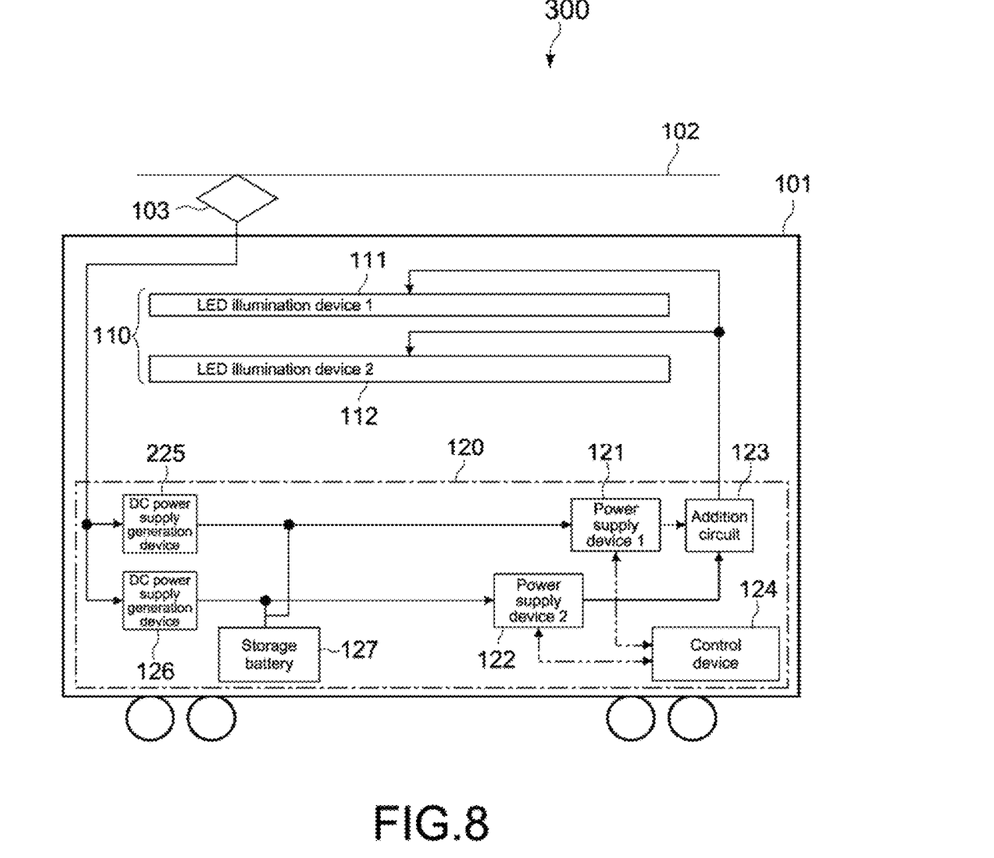
FIG. 8 A schematic diagram showing a modified example of a configuration of the railroad car.

For example, although in the above-mentioned embodiments, the description has been made by exemplifying the car in which the power supply input of the power supply system 120 is a mixed type of AC (alternate current) and DC (direct current) as the railroad car 100, the present invention is not limited thereto. For example, as schematically shown in FIG. 8, the present invention is also applicable to a car in which the power supply input of the power supply system 120 is a DC-dedicated type (car mainly used for a bullet train or some subway) as a railroad car 300.

In this case, a DC power supply generation device 235 is used as the first power supply device 121 as in the second power supply device 122. The DC power supply generation device 235 may be configured as a device common to the other DC power supply generation device 126. In accordance with this example, not only the second power supply device 122 but also the first power supply device 121 are enabled to use the power of the storage battery 127.

Further, although in the above-mentioned embodiments, the description has been made by exemplifying the LED illumination devices 111, 112 as the load device connected to the power supply system, the present invention is not limited thereto. The present invention is also applicable to other load devices such as various types of monitors and destination guiding display boards which are provided in a compartment. Further, the present invention is also applicable to applications other than the railroad car.

REFERENCE SIGNS LIST

10 LED lighting device
100, 300 railroad car
101 car main body
110 car illumination device
111, 112 LED illumination device
120, 220 power supply system
121, 221 first power supply device
122, 222 second power supply device
123 addition circuit
124 control device
127 storage battery
213, 223 constant-current circuit
214, 224 monitoring/determining unit
217, 227 self-diagnosis circuit
218, 228 determining unit
DA1 first direct current
DA2 second direct current
DA3 third direct current

The invention claimed is:

1. A power supply system, comprising:
a first power supply device including
a first driving circuit that outputs a first direct current from a first power supply input,
a first self-diagnosis circuit that diagnoses an operation of the first driving circuit, and
a first control circuit that controls the first driving circuit;
a second power supply device including
a second driving circuit that outputs a second direct current from a second power supply input,
a second self-diagnosis circuit that diagnoses an operation of the second driving circuit, and
a second control circuit that is configured to be capable of communicating with the first control circuit and controls the second driving circuit on a basis of an output of the first self-diagnosis circuit; and
an addition circuit that is connected to an output terminal of each of the first and second power supply devices and outputs a third direct current that is a value obtained by adding the first and second direct currents to a load device.

2. The power supply system according to claim 1, wherein the first control circuit controls the first driving circuit on a basis of an output of the second self-diagnosis circuit.

3. The power supply system according to claim 2, wherein the first and second control circuits control the first and second driving circuits such that when an output of either one of the first and second driving circuits drops, an amount corresponding to the drop is compensated by an output of the other one.

4. The power supply system according to claim 1, wherein the first power supply input is AC power or DC power, the second power supply input is DC power, and the power supply system further comprises a storage battery connected to the second power supply device.

5. The power supply system according to claim 4, further comprising
a control device that controls the first and second power supply devices, wherein
the control device switches, when detecting an abnormality in the first and second power supply inputs, from a first state in which the second power supply input is supplied to the second power supply device to a second state in which discharged power of the storage battery is supplied to the second power supply device.

6. The power supply system according to claim 5, wherein the control device outputs, in the second state, a control command to reduce the third direct current to the second control circuit.

7. A railroad car, comprising:
an on-board illumination device including a plurality of LEDs connected in series;
a first power supply device including
a first driving circuit that outputs a first direct current from a first power supply input,
a first self-diagnosis circuit that diagnoses an operation of the first driving circuit, and
a first control circuit that controls the first driving circuit;
a second power supply device including
a second driving circuit that outputs a second direct current from a second power supply input,
a second self-diagnosis circuit that diagnoses an operation of the second driving circuit, and
a second control circuit that is configured to be capable of communicating with the first control circuit and controls the second driving circuit on a basis of an output of the first self-diagnosis circuit; and
an addition circuit that is connected to an output terminal of each of the first and second power supply devices and outputs a third direct current that is a value obtained by adding the first and second direct currents to the on-board illumination device.

* * * * *